US009344290B2

(12) United States Patent
Song

(10) Patent No.: US 9,344,290 B2
(45) Date of Patent: May 17, 2016

(54) TERMINATING A MULTICAST SESSION WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1028 days.

(21) Appl. No.: 12/212,885

(22) Filed: Sep. 18, 2008

(65) Prior Publication Data

US 2009/0080358 A1 Mar. 26, 2009

Related U.S. Application Data

(60) Provisional application No. 61/048,734, filed on Apr. 29, 2008, provisional application No. 60/974,833, filed on Sep. 24, 2007.

(51) Int. Cl.
| | |
|---|---|
| H04W 4/00 | (2009.01) |
| H04L 12/18 | (2006.01) |
| H04W 76/06 | (2009.01) |
| H04L 29/06 | (2006.01) |
| H04W 76/00 | (2009.01) |
| H04W 72/00 | (2009.01) |

(52) U.S. Cl.
CPC ........... *H04L 12/189* (2013.01); *H04W 76/002* (2013.01); *H04W 76/06* (2013.01); *H04L 63/10* (2013.01); *H04W 72/005* (2013.01); *H04W 76/005* (2013.01)

(58) Field of Classification Search
None
See application file for complete search history.

(56) References Cited

U.S. PATENT DOCUMENTS

| | | | | |
|---|---|---|---|---|
| 5,600,635 | A * | 2/1997 | Hamaki et al. | 370/280 |
| 6,055,560 | A * | 4/2000 | Mills et al. | 709/200 |
| 6,442,390 | B1 * | 8/2002 | Sano | 455/450 |
| 6,804,528 | B1 | 10/2004 | Laroia et al. | |
| 6,839,767 | B1 * | 1/2005 | Davies et al. | 709/232 |

(Continued)

FOREIGN PATENT DOCUMENTS

| | | |
|---|---|---|
| CN | 1565104 A | 1/2005 |
| JP | 2001359161 A | 12/2001 |

(Continued)

OTHER PUBLICATIONS

European Search Report—EP10159408—Munich—May 12, 2010.

(Continued)

*Primary Examiner* — Jutai Kao
(74) *Attorney, Agent, or Firm* — James T. Hagler; Michael Taveira

(57) ABSTRACT

A wireless communication system and methods thereof are disclosed. A server (e.g., a push-to-talk (PTT) server) determines a multicast message to be a final multicast message for a multicast session having an indeterminate end time. The server inserts a flag into the multicast message, the inserted flag indicating that the flagged multicast message is a final multicast message for the multicast session. The server sends the flagged multicast message to a communication entity (e.g., a radio access network (RAN), a broadcast serving node (BSN), etc.) supporting the multicast session. The communication entity (e.g., RAN, BSN, etc.) receives the multicast message from the server. The communication entity determines whether the received multicast message includes a flag relating to multicast session termination. The communication entity releases at least one channel associated with the multicast session based on the determining step.

59 Claims, 6 Drawing Sheets

(56) References Cited

U.S. PATENT DOCUMENTS

| | | | |
|---|---|---|---|
| 6,901,058 B2 | 5/2005 | Lalwaney | |
| 6,977,928 B1* | 12/2005 | Bass et al. | 370/390 |
| 7,092,381 B2 | 8/2006 | Carlsson et al. | |
| 7,945,234 B2 | 5/2011 | Lee et al. | |
| 2001/0026549 A1 | 10/2001 | Hameleers et al. | |
| 2002/0003787 A1 | 1/2002 | Hayama et al. | |
| 2002/0152321 A1 | 10/2002 | Le et al. | |
| 2003/0235181 A1* | 12/2003 | Semper et al. | 370/350 |
| 2004/0132448 A1* | 7/2004 | Torres et al. | 455/427 |
| 2006/0039482 A1* | 2/2006 | Cho | 375/240.26 |
| 2006/0053452 A1* | 3/2006 | Lee et al. | 725/81 |
| 2006/0092863 A1 | 5/2006 | Schmidt et al. | |
| 2006/0109846 A1* | 5/2006 | Lioy et al. | 370/389 |
| 2006/0223510 A1 | 10/2006 | Takeda et al. | |
| 2007/0049314 A1* | 3/2007 | Balachandran et al. | 455/518 |
| 2007/0130362 A1 | 6/2007 | Oommen et al. | |
| 2007/0213081 A1* | 9/2007 | Zhang | 455/466 |
| 2007/0218928 A1* | 9/2007 | Kuo | 455/466 |
| 2007/0280138 A1* | 12/2007 | Stern | 370/254 |
| 2009/0080357 A1 | 3/2009 | Song et al. | |
| 2014/0016535 A1 | 1/2014 | Song et al. | |

FOREIGN PATENT DOCUMENTS

| | | |
|---|---|---|
| JP | 2002095065 A | 3/2002 |
| JP | 2002204204 A | 7/2002 |
| JP | 2008530960 A | 8/2008 |
| WO | WO03060452 A2 | 7/2003 |
| WO | 2005041459 | 5/2005 |
| WO | WO2006002218 | 1/2006 |
| WO | 2006089197 A1 | 8/2006 |
| WO | 2007011271 | 1/2007 |

OTHER PUBLICATIONS

International Search Report—PCT/US08/077016, International Search Authority—European Patent Office—Apr. 28, 2009.

Written Opinion—PCT/US08/077016, International Search Authority—European Patent Office—Apr. 28, 2009.

International Preliminary Report on Patentability, PCT/US2008/077536, International Preliminary Examining Authority, European Patent Office, Dec. 14, 2009.

3GPP2 "CDMA2000 High Rate Broadcase-Multicast Packet Data Air Interface Specification," Feb. 14, 2006, version 1.0 C.S0054-A.

International Earch Report—PCT/US08/077536, International Search Authroity—European Patent Office—Feb. 2, 2009.

Written Opinion—PCT/US08/077536, International Search Authroity—European Patent Office—Feb. 2, 2009.

\* cited by examiner

TERMINATING A MULTICAST SESSION WITHIN A WIRELESS COMMUNICATIONS NETWORK

CLAIM OF PRIORITY UNDER 35 U.S.C. §119

The present Application for Patent claims priority to Provisional Application No. 60/974,833, entitled "MULTICAST MESSAGING WITHIN A WIRELESS COMMUNICATION SYSTEM", filed Sep. 24, 2007, and to Provisional Application No. 61/048,734, entitled "METHODS OF TERMINATING A MULTICAST SESSION WITHIN A WIRELESS COMMUNICATIONS NETWORK", filed Apr. 29, 2008, each of which is assigned to the assignee hereof and hereby expressly incorporated by reference herein in its entirety.

BACKGROUND OF THE INVENTION

1. Field of the Invention

The invention relates to communications in a wireless telecommunication system and, more particularly to methods of terminating a multicast session within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the present invention are directed to a wireless communication system and methods thereof. A server (e.g., a push-to-talk (PTT) server) determines a multicast message to be a final multicast message for a multicast session having an indeterminate end time. The server inserts a flag into the multicast message, the inserted flag indicating that the flagged multicast message is a final multicast message for the multicast session. The server sends the flagged multicast message to a communication entity (e.g., a radio access network (RAN), a broadcast serving node (BSN), etc.) supporting the multicast session. The communication entity (e.g., RAN, BSN, etc.) receives the multicast message from the server. The communication entity determines whether the received multicast message includes a flag relating to multicast session termination. The communication entity releases at least one channel associated with the multicast session based on the determining step.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
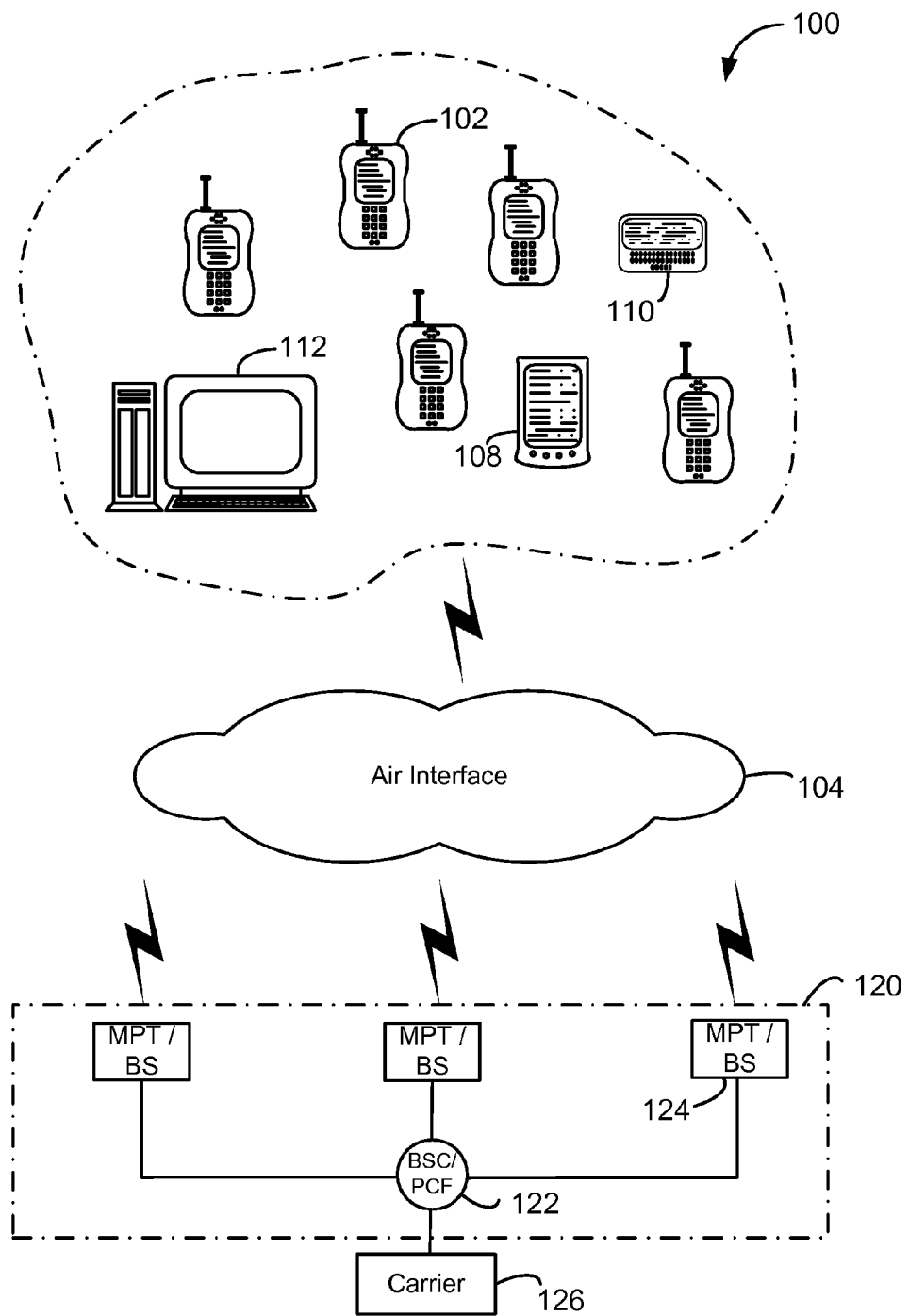
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
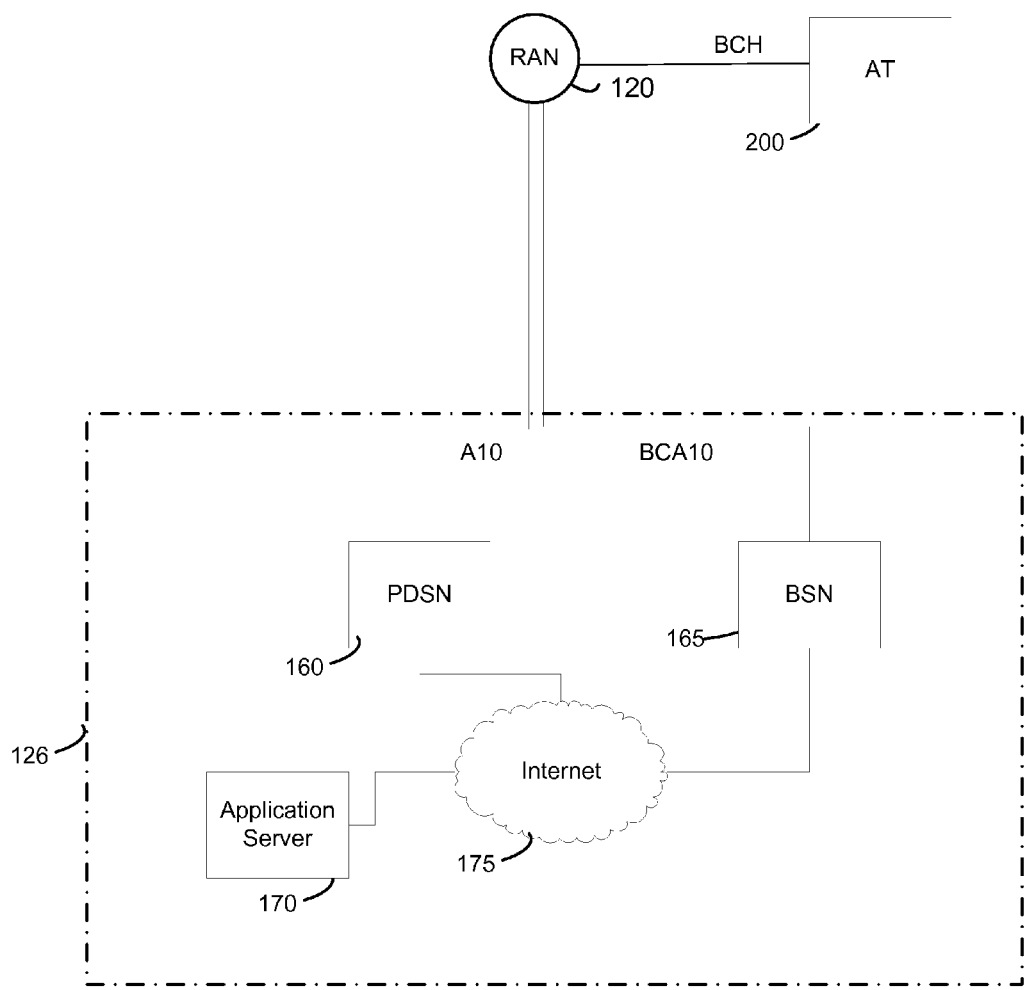
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity. While not illustrated, the application server 170 may be configured to include a broadcast and multicast service (BCMCS) content provider, one or more AAA servers, a push-to-talk (PTT) server, a media duplicator, a group management database, a call logging device, etc., the function of each being well-known in the art.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BC A10 connection is used to transfer multicast and/or broadcast messaging. Accordingly, the application server 170 sends unicast messaging to the PDSN 160 via the Internet 175, and sends multicast messaging to the BSN 165 via the Internet 175.

Again referring to FIG. 2, a BCMCS content server (not shown) makes BCMCS content (e.g., push-to-talk (PTT) audio packets) available within an IP multicast stream. If higher layer encryption is enabled, the BCMCS content server may encrypt the stream content.

Generally, as will be described in greater detail below, the RAN 120 transmits multicast messages, received from the BSN 165 via the BC A10 connection, over a broadcast channel (BCH) of the air interface 104 to one or more access terminals 200.

Figure 3:
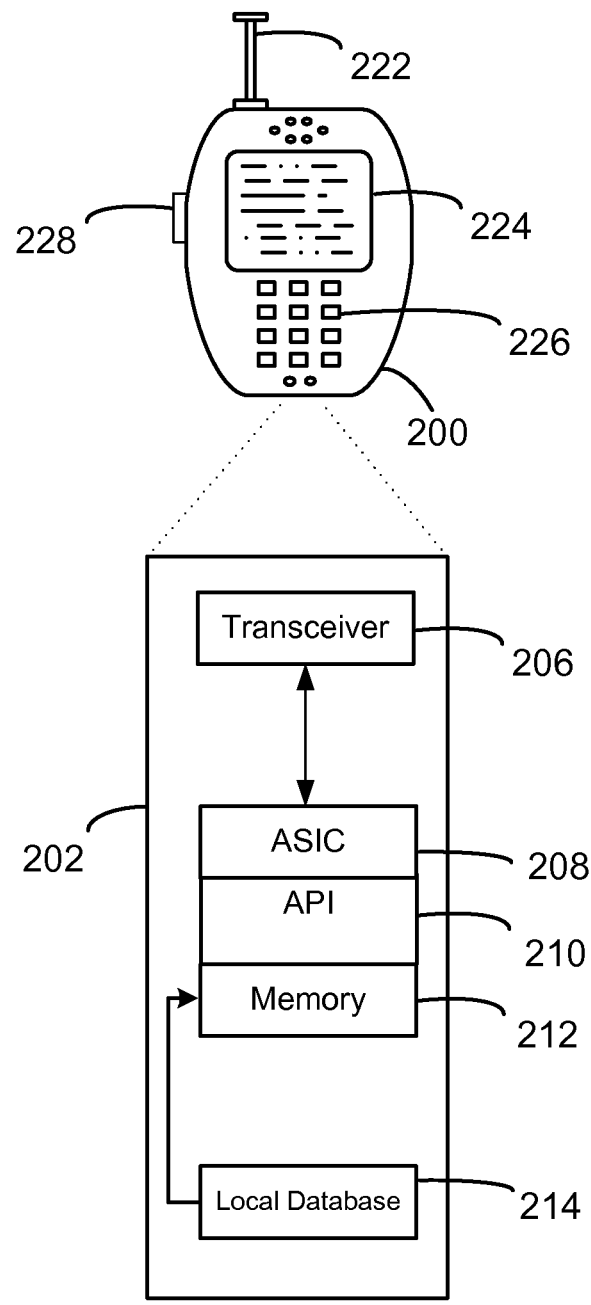
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the Background section, multicast messaging may be performed in a number of ways. In order to better understand embodiments of the present invention, a conventional multicast session termination process will be described with respect to FIG. 4. Then, multicast session termination processes according to embodiments of the present invention will be described in greater detail.

Figure 4:
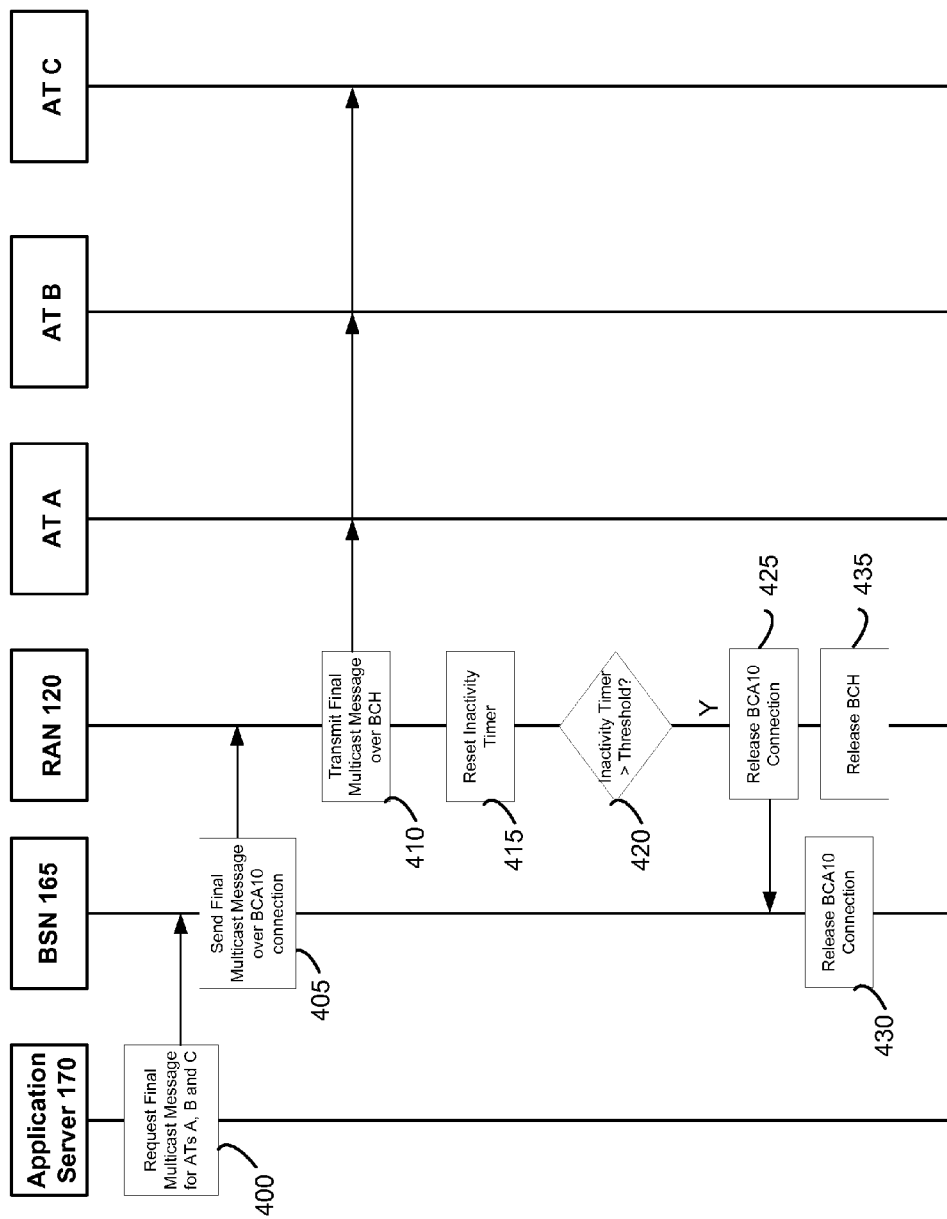
FIG. 4 illustrates a conventional multicast session termination process using a broadcast and multicast server (BC-MCS) framework.

FIG. 4 illustrates a conventional multicast session termination process using a broadcast and multicast server (BCMCS) framework. The multicast session termination process of FIG. 4 is described below as performed within the wireless system 100 of FIGS. 1 and 2. Referring to FIG. 4, in 400, the application server 170 (or other initiator) requests a multicast message be sent to a multicast group including ATs (e.g., A, B and C). For the purposes of description, assume that the multicast message of 400 is a final or last multicast message for a particular "indeterminate" multicast session. Accordingly, in 400, the "final" multicast message from 400 is routed to the BSN 165. Generally, for multicast sessions of indeterminate length (e.g., PTT sessions), or "indeterminate multicast sessions", information related to whether a particular multicast message is the last multicast message for a given multicast session is known at the application server 170 (e.g., a BCMCS content server, a PTT server, etc.), but this information is not known at the BSN 165 and/or the RAN 120.

In 405, the BSN 165 forwards the final multicast message over the BCA10 connection to the RAN 120. For example, the multicast message is first forwarded to the BSC/PCF 122, and the BSC/PCF 122 analyzes the multicast group members for the multicast message and forwards the multicast message to each MPT/BS 124 serving one or more multicast group members. As discussed above, conventionally, the BSN 165 cannot distinguish between a "final" multicast message and "non-final" multicast messages for a given multicast session. Accordingly, in 405, the BSN 165 treats the final multicast message in the same manner it would treat a non-final multicast message.

After receiving the forwarded multicast message, the RAN 120 transmits the final multicast message to each target AT over the BCH, 410. As discussed above, conventionally, the RAN 120 cannot distinguish between a "final" multicast message and "non-final" multicast messages for a given multicast session. Accordingly, in 410, the RAN 120 treats the final multicast message in the same manner it would treat a non-final multicast message.

While not illustrated in FIG. 4, it is understood that additional steps may first be performed to facilitate the multicast message transmission of 410. For example, the RAN 120 may first transmit a broadcast overhead message (BOM) to target ATs (e.g., on a downlink control channel having a reserved slot for the BOM), the BOM including information regarding the BCMCS flow or multicast session associated with the final multicast message. Thus, the BOM may instruct the target ATs with regard to how to "tune" properly to the transmission of the final multicast message. BOMs are well-known in the art and will not be described further for the sake of brevity.

Next, in 415, the RAN 120 resets or starts an inactivity timer. In an example, while not illustrated in FIG. 4, the inactivity timer may be reset or started each time "activity" is registered at the RAN 120. For example, as used herein, activity may include a downlink multicast message for a given multicast session being processed, as in 410.

In 420, the RAN 120 determines whether the inactivity timer exceeds a timer threshold. For example, if the inactivity timer is not reset or stopped (i.e., by "activity" such as multicast messaging), the inactivity timer will eventually exceed the timer threshold. The timer threshold is established by a system designer, and may typically be relatively long (e.g., 10 seconds or longer). The timer threshold corresponds to a "waiting" period for the RAN 120, where the RAN 120 waits for any multicast session activity before "tearing down" the channels associated with the multicast session. While not discussed in detail within this application, a multicast session with a known end time (e.g., a music video stream, etc.), or "determinate multicast session", need not deploy an inactivity timer because the end time of a determinate multicast session is indicated to the BSN 165 and RAN 120, such that the final multicast message is known to be final, and the channels associated/reserved for the multicast session may be torn down (e.g., made available, reallocated, etc.) immediately without waiting for the inactivity timer to expire.

Once the inactivity timer is determined to exceed the timer threshold, the RAN 120 "tears down" or releases the BCA10 connection to the BSN 165 for the given multicast session associated with the final multicast message in 425. Likewise, in 430, the BSN 165 tears down the BCA10 connection at its end responsive to 425. The RAN 120 also tears down, or releases, the BCH for the given multicast session, 435. The tearing down or releasing of 425, 430 and 435 is well-known in the art, and is typically performed with messaging defined in EV-DO standards, and as such will not be described in further detail for the sake of brevity.

As described above with respect to the process of FIG. 4, the BSN 165 and the RAN 120 typically have no way of knowing when a multicast session is going to end for certain types of multicast communications (i.e., indeterminate multicast sessions). For example, a push-to-talk (PTT) session is typically an indeterminate multicast session that does not usually have a designated end time or termination time for the session. Accordingly, the BSN 165 and RAN 120 rely upon multicast session inactivity as an imperfect indicator for indicating when an indeterminate multicast session has ended. To reduce "false positives", the inactivity timer is set to a relatively long period of time, which is inefficient in the sense that channels reserved for a multicast session that has ended must wait for the inactivity timer to reach the timer threshold before being released or becoming available for other communication flows.

Figure 5:
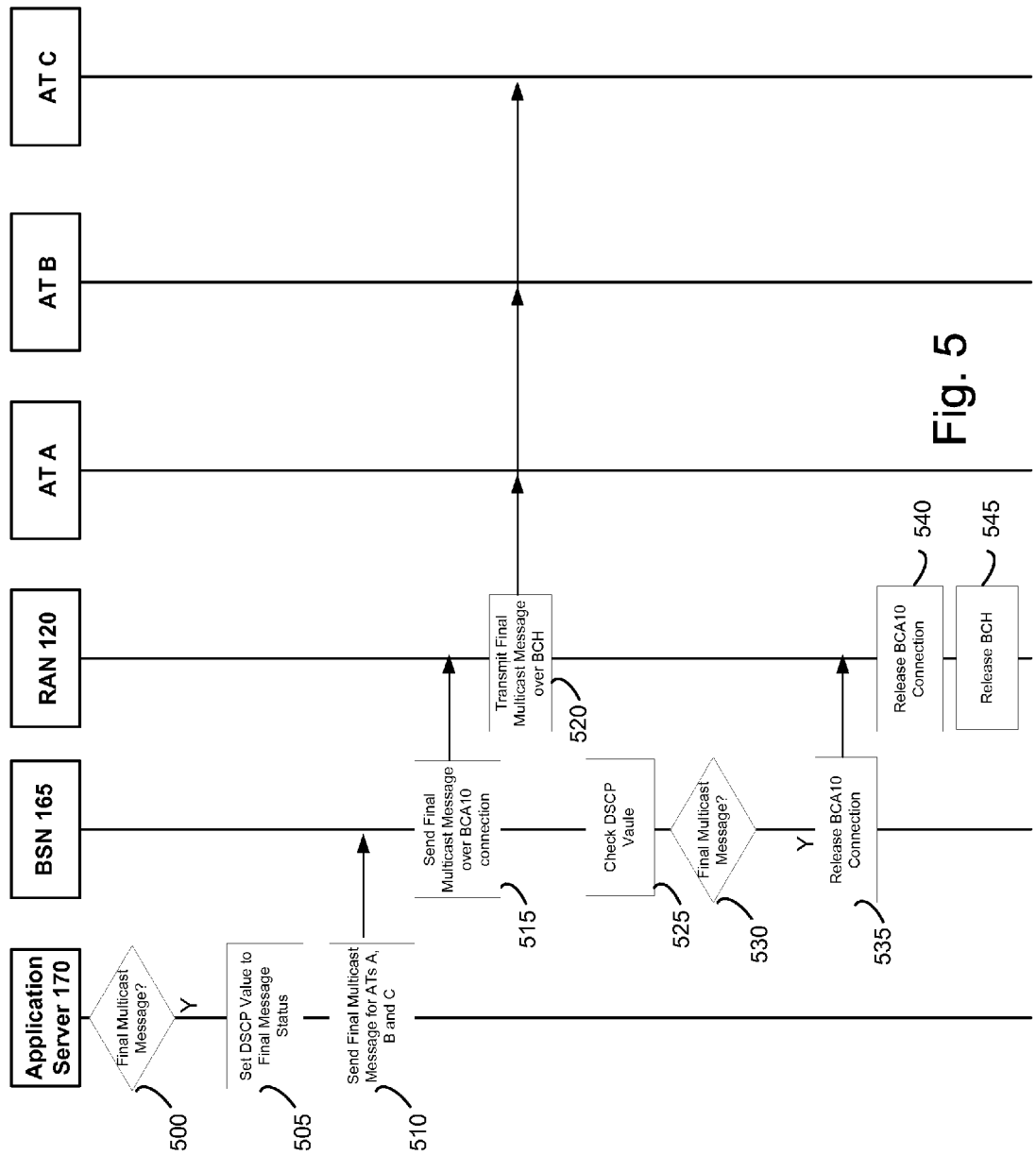
FIG. 5 illustrates a multicast session termination process according to an embodiment of the present invention.

FIG. 5 illustrates a multicast session termination process according to an embodiment of the present invention. In 500, the application server 170 (e.g., BCMCS content server, a PTT server, etc.) determines whether a multicast message to be sent to one or more target ATs belonging to a multicast group with an active multicast session is a last, or final, multicast message for the multicast session.

In 505, the application server 170 inserts a "flag" into the final multicast message. The flag is intended to convey to a communication entity, such as the BSN 165 in FIG. 5, that the multicast message including the flag is a "final" multicast message. In an example, the flag may be inserted by setting or adjusting a differentiated service code point (DSCP) value of the multicast message. In an example, the application server 170 and BSN 165 may agree to use a particular DSCP value to indicate a final message status, and the application server 170 sets the DSCP value to the particular or predetermined DSCP value in 505. However, it will be appreciated by one of ordinary skill in the art that the flag need not be limited to a DSCP value, and in alternative embodiments the flag may constitute any portion of the multicast message. Next, in 510, the application server 170 sends the "flagged" final multicast message to the BSN 165.

In 515, the BSN 165 receives the final multicast message from the application server 170 and forwards the final multicast message to the RAN 120 over the BCA10 connection. For example, the final multicast message is first forwarded to the BSC/PCF 122, and the BSC/PCF 122 analyzes the multicast group members for the multicast message and forwards the multicast message to each MPT/BS 124 serving one or more multicast group members. Upon receiving the forwarded multicast message, the RAN 120 transmits the final multicast message to each target AT over the BCH, 520.

While not illustrated in FIG. 5, it is understood that additional steps may first be performed to facilitate the multicast message transmission of 520. For example, the RAN 120 may first transmit a broadcast overhead message (BOM) to target ATs (e.g., on a downlink control channel having a reserved slot for the BOM), the BOM including information regarding the BCMCS flow or multicast session associated with the final multicast message. Thus, the BOM may instruct the target ATs with regard to how to "tune" properly to the transmission of the final multicast message. BOMs are well-known in the art and will not be described further for the sake of brevity.

In 525, the BSN 165 checks the DSCP value of the multicast message. In 530, the BSN 165 determines whether the received multicast message is a final multicast message based on the DSCP value. If the RAN 120 determines that the DSCP value is set to final message status in 530, the process advances to 535. Otherwise, if no "flag" or DSCP final status value is determined to be present in 530, the BSN 165 takes no further action for determining multicast session termination, and, while not shown in FIG. 5, the conventional inactivity timer is used by the RAN 120 to determine when the multicast session has ended.

Typically, the last packet of a multicast session is a signaling packet indicating the end of a call (e.g., to the target ATs which actually decode the multicast message). For a given call, the RAN 120 and/or BSN 165 may assign different BCMCS Flow IDs to media flows (e.g., including data, such as video and/or audio data), and signaling flows (e.g., which include control-type signaling, etc.). Accordingly, in an example, steps 525 and 530 only need be performed for signaling flow packets.

In 535, the BSN 165 "tears down" or releases the BCA10 connection(s) for both media and signaling flows to the RAN 120 for the given multicast session associated with the final multicast message in 535 after forwarding the final multicast message to the RAN 120. For example, the BCA10 connection may be released by the BSN 165 immediately after 525. Likewise, in 540, the RAN 120 tears down the BCA10 connection(s) for both media and signaling flows at its end responsive to 525. The RAN 120 also tears down, or releases, the BCH(s) for the given multicast session, 545. Accordingly, the BCA10 and BCH channels associated with the given multicast session for the final multicast message may be released, or be made available, much sooner than in the conventional art, which must wait for an inactivity timer to expire. Accordingly, the efficiency of the wireless communication system is increased.

Figure 6:
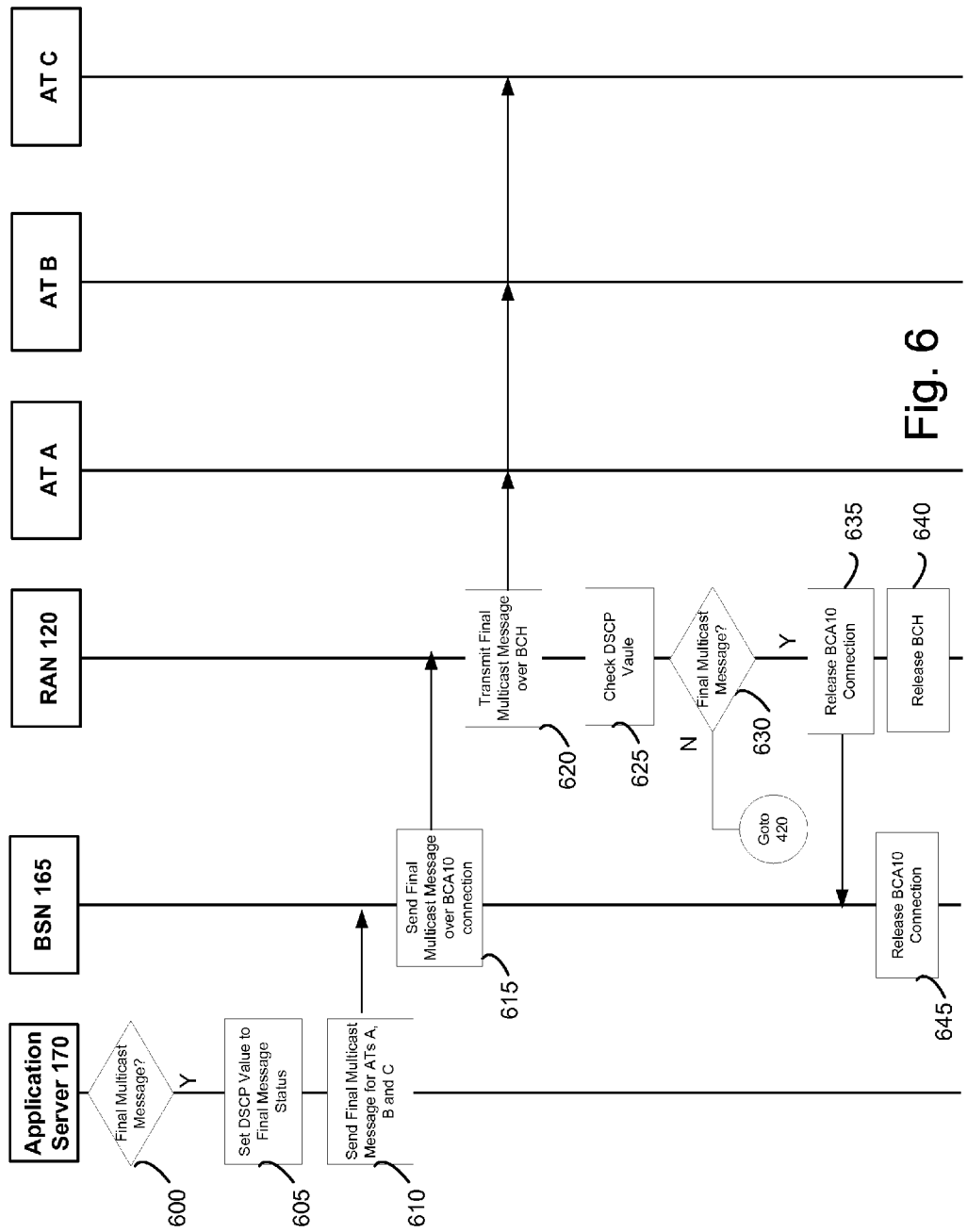
FIG. 6 illustrates a multicast session termination process according to another embodiment of the present invention.

FIG. 6 illustrates a multicast session termination process according to another embodiment of the present invention. In 600, the application server 170 (e.g., BCMCS content server, a PTT server, etc.) determines whether a multicast message to be sent to one or more target ATs belonging to a multicast group with an active multicast session is a last, or final, multicast message for the multicast session.

In 605, the application server 170 inserts a "flag" into the final multicast message. Generally, 605 corresponds to 505 of FIG. 5, and as such will not be described further for the sake of brevity. The application server then sends the flagged, final multicast message to the BSN 165, 610.

In 615, the BSN 165 receives the final multicast message from the application server 170 and forwards the final multicast message to the RAN 120 over the BCA10 connection. For example, the final multicast message is first forwarded to the BSC/PCF 122, and the BSC/PCF 122 analyzes the multicast group members for the multicast message and forwards the multicast message to each MPT/BS 124 serving one or more multicast group members.

Upon receiving the forwarded multicast message, the RAN 120 transmits the final multicast message to each target AT over the BCH, 620. While not illustrated in FIG. 6, it is understood that additional steps may first be performed to facilitate the multicast message transmission of 620. For example, the RAN 120 may first transmit a broadcast overhead message (BOM) to target ATs (e.g., on a downlink control channel having a reserved slot for the BOM), the BOM including information regarding the BCMCS flow or multicast session associated with the final multicast message. Thus, the BOM may instruct the target ATs with regard to how to "tune" properly to the transmission of the final multicast message. BOMs are well-known in the art and will not be described further for the sake of brevity.

In 625, the RAN 120 checks the DSCP value of the multicast message. In 625, the RAN 120 determines whether the received multicast message is a final multicast message based on the DSCP value. If the RAN 120 determines that the DSCP value is set to final message status in 630, the process advances to 635. Otherwise, if no "flag" or DSCP final status value is determined to be present in 630, the process advances to 420 of FIG. 4, and the conventional inactivity timer is used to determine when the multicast session has ended.

As discussed above, typically, the last packet of a multicast session is a signaling packet indicating the end of a call (e.g., to the target ATs which actually decode the multicast message). For a given call, the RAN 120 and/or BSN 165 may assign different BCMCS Flow IDs to media flows (e.g., including data, such as video and/or audio data), and signaling flows (e.g., which include control-type signaling, etc.). Accordingly, in an example, steps 525 and 530 only need be performed for signaling flow packets.

In 635, the RAN 120 "tears down" or releases the BCA10 connection(s) for both media and signaling flows to the BSN 165 for the given multicast session associated with the final multicast message in 425. Likewise, in 645, the BSN 165 tears down the BCA10 connection(s) for both media and signaling flows at its end responsive to 635. The RAN 120 also tears down, or releases, the BCH(s) for the given multicast session in 640. Accordingly, the BCA10 and BCH channels associated with the given multicast session for the final multicast message may be released, or be made available, much sooner than in the conventional art, which must wait for an inactivity timer to expire. Accordingly, the efficiency of the wireless communication system is increased.

Further, while FIGS. 5 and 6 are directed to embodiments wherein a DSCP value is used as a flag to indicate a final-message status to either the BSN 165 or the RAN 120, it will be appreciated that the conventional timer-based final-status determination can be used in parallel with the processes of FIGS. 5 and/or 6. In other words, a reset inactivity timer can be used as a fail-safe process in case, for example, the DSCP value includes an error or is otherwise unable to convey final-message status to the RAN 120 and/or the BSN 165. Thus, the conventional manner (e.g., as in FIG. 4) of tearing down the BCA10 connection effectively becomes the worst-case scenario if the conventional reset inactivity timer is used in conjunction with embodiments of the present invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of terminating a multicast session, comprising:
   determining a multicast message to be a final multicast message of a signaling flow for the multicast session having an indeterminate end time, the signaling flow separate from a media flow for the multicast session;
   inserting a flag into the multicast message, the inserted flag indicating that the flagged multicast message is a final multicast message for the multicast session, wherein inserting the flag includes setting a differentiated service code point (DSCP) value of the multicast message to a given value; and
   sending the flagged multicast message to a non-user device communication network entity, the flagged multicast message configured to prompt the non-user device communication network entity to release at least one channel that is supporting the multicast session to a target set of multicast device participants in response to receiving the flagged multicast message.

2. The method of claim 1, wherein the non-user device communication network entity prompted to release the at least one channel is expected to interpret the DSCP value being set to the given value as an indication that the flagged multicast message is the final multicast message for the multicast session.

3. The method of claim 1, wherein the non-user device communication network entity prompted to release the at least one channel comprises one of a broadcast serving node (BSN) or a radio access network (RAN).

4. The method of claim 1, wherein the multicast message corresponds to a signaling packet.

5. The method of claim 4, wherein the non-user device communication network entity prompted to release the at least one channel assigns a first broadcast and multicast service (BCMCS) flow identifier (ID) to signaling packets associated with the multicast session and assigns a second BCMCS flow ID to media packets associated with the multicast session.

6. The method of claim 1, wherein the multicast session corresponds to a push-to-talk (PTT) call.

7. The method of claim 1, wherein the non-user device communication network entity prompted to release the at least one channel comprises a broadcast serving node (BSN) and the at least one channel comprises a broadcast A10 connection.

8. The method of claim 1, wherein the non-user device communication network entity prompted to release the at least one channel comprises a radio access network (RAN) and the at least one channel comprises a wireless broadcast channel.

9. The method of claim 1, wherein the target set of multicast device participants receive the flagged multicast message over a wireless broadcast channel.

10. The method of claim 1, wherein the inserting is only performed for signaling packets of the signaling flow and not for media packets of the media flow.

11. The method of claim 1, wherein the determining, inserting, and sending are performed by a server.

12. A method of terminating a multicast session at a non-user device communication network entity configured to support the multicast session, comprising:
receiving, at the non-user device communication network entity, a multicast message associated with the multicast session having an indeterminate end time, wherein the multicast message is a final multicast message of a signaling flow for the multicast session, the signaling flow separate from a media flow for the multicast session;
determining, at the non-user device communication network entity, that the received multicast message includes a flag indicating multicast session termination, wherein the flag is a differentiated service code point (DSCP) value of the received multicast message set to a given value; and
releasing, at the non-user device communication network entity, at least one channel associated with the multicast session in response to the determining.

13. The method of claim 12, wherein the DSCP value being set to the given value is known to indicate that the received multicast message is a final multicast message for the multicast session.

14. The method of claim 12, wherein the at least one released channel includes at least one of (i) a BCA10 channel between a radio access network (RAN) and a broadcast serving node (BSN) or (ii) a downlink broadcast channel (BCH) from the RAN to one or more access terminals (ATs).

15. The method of claim 12, wherein the receiving and determining are performed at a radio access network (RAN).

16. The method of claim 12, wherein the receiving and determining are performed at a broadcast serving node (BSN).

17. The method of claim 12, wherein the received multicast message corresponds to a signaling packet.

18. The method of claim 12, further comprising:
assigning a first broadcast and multicast service (BCMCS) flow identifier (ID) for signaling packets associated with the multicast session; and
assigning a second BCMCS flow ID for media packets associated with the multicast session.

19. The method of claim 18, wherein the received multicast message corresponds to a signaling packet.

20. The method of claim 12, wherein the determining is only performed for signaling packets of the signaling flow and not for media packets of the media flow.

21. The method of claim 12, further comprising:
resetting a reset inactivity timer after the receiving; and
releasing the at least one channel associated with the multicast session based on the reset inactivity timer exceeding a timer threshold and the determining determines that the received multicast message does not include the flag relating to multicast session termination.

22. The method of claim 12,
wherein the at least one channel includes a network backhaul channel between two communication network entities that are supporting the multicast session to a set of target multicast devices for the multicast message, and
wherein the received multicast message triggers one of the two communication network entities to initiate release of the network backhaul channel with the other of the two communication network entities.

23. A server comprising:
logic configured to determine a multicast message to be a final multicast message of a signaling flow for a multicast session having an indeterminate end time, the signaling flow separate from a media flow for the multicast session;
logic configured to insert a flag into the multicast message indicating the multicast message is a final multicast message for the multicast session, wherein the logic configured to insert the flag is configured to set a differentiated service code point (DSCP) value of the multicast message to a given value; and
logic configured to send the flagged multicast message to a non-user device communication network entity, the flagged multicast message configured to prompt the non-user device communication network entity to release at least one channel that is supporting the multicast session to a target set of multicast device participants in response to reception of the flagged multicast message.

24. The server of claim 23, wherein the server is a push-to-talk (PTT) server.

25. The server of claim 23, wherein the non-user device communication network entity prompted to release the at least one channel is configured to interpret the DSCP value being set to the given value as an indication that the flagged multicast message is the final multicast message for the multicast session.

26. The server of claim 23, wherein the non-user device communication network entity prompted to release the at least one channel comprises one of a broadcast serving node (BSN) or a radio access network (RAN).

27. The server of claim 23, wherein the multicast message corresponds to a signaling packet.

28. The server of claim 27, wherein the non-user device communication network entity prompted to release the at least one channel assigns a first broadcast and multicast service (BCMCS) flow identifier (ID) to signaling packets associated with the multicast session and assigns a second BCMCS flow ID to media packets associated with the multicast session.

29. A non-user device communication network entity, comprising:
logic configured to receive a multicast message associated with a multicast session having an indeterminate end time, wherein the multicast message is a final multicast message of a signaling flow for the multicast session, the signaling flow separate from a media flow for the multicast session;
logic configured to determine that the received multicast message includes a flag indicating multicast session termination, wherein the flag is a differentiated service code point (DSCP) value of the received multicast message set to a given value; and
logic configured to release at least one channel associated with the multicast session based on the determination that the received multicast message includes the flag indicating multicast session termination.

30. The non-user device communication network entity of claim 29, wherein the non-user device communication network entity prompted to release the at least one channel comprises one of a radio access network (RAN) or a broadcast serving node (BSN).

31. The non-user device communication network entity of claim 29, wherein the non-user device communication network entity prompted to release the at least one channel interprets the DSCP value being set to the given value as indicating that the received multicast message is a final multicast message for the multicast session.

32. The non-user device communication network entity of claim 29, wherein the at least one released channel includes at least one of (i) a BCA10 channel between a radio access network (RAN) and a broadcast serving node (BSN) or (ii) a downlink broadcast channel (BCH) from the RAN to one or more access terminals (ATs).

33. The non-user device communication network entity of claim 29, wherein the received multicast message corresponds to a signaling packet.

34. The non-user device communication network entity of claim 25, wherein a first broadcast and multicast service (BCMCS) flow identifier (ID) is assigned for signaling packets associated
with the multicast session and a second BCMCS flow ID is assigned for media packets associated with the multicast session.

35. The non-user device communication network entity of claim 34, wherein the received multicast message corresponds to a signaling packet.

36. The non-user device communication network entity of claim 29, wherein the non-user device communication network entity prompted to release the at least one channel only determines whether flags associated with multicast message termination are present within signaling packets.

37. The non-user device communication network entity of claim 29, wherein the non-user device communication network entity is:
configured to reset a reset inactivity timer after reception of the multicast message; and
configured to release the at least one channel associated with the multicast session based on the reset inactivity timer exceeding a timer threshold and the logic configured to determine determines that the received multicast message does not include the flag relating to multicast session termination.

38. A server comprising:
means for determining a multicast message to be a final multicast message of a signaling flow for a multicast session having an indeterminate end time, the signaling flow separate from a media flow for the multicast session;
means for inserting a flag into the multicast message, the inserted flag indicating that the flagged multicast message is the final multicast message for the multicast session, wherein the means for inserting inserts the flag by setting a differentiated service code point (DSCP) value of the multicast message to a given value; and
means for sending the flagged multicast message to a non-user device communication network entity, the flagged multicast message configured to prompt the non-user device communication network entity to release at least one channel that is supporting the multicast session to a target set of multicast device participants in response to reception of the flagged multicast message.

39. The server of claim 38, wherein the non-user device communication network entity prompted to release the at least one channel is configured to interpret the DSCP value being set to the given value as an indication that the flagged multicast message is the final multicast message for the multicast session.

40. The server of claim 38, wherein the non-user device communication network entity prompted to release the at least one channel comprises one of a broadcast serving node (BSN) or a radio access network (RAN).

41. The server of claim 38, wherein the multicast message corresponds to a signaling packet.

42. The server of claim 41, wherein the non-user device communication network entity prompted to release the at least one channel assigns a first broadcast and multicast service (BCMCS) flow identifier (ID) to signaling packets associated with the multicast session and assigns a second BCMCS flow ID to media packets associated with the multicast session.

43. A non-user device communication network entity, comprising:
means for receiving a multicast message associated with a multicast session having an indeterminate end time, wherein the multicast message is a final multicast message of a signaling flow for the multicast session, the signaling flow separate from a media flow for the multicast session;
means for determining that the received multicast message includes a flag indicating multicast session termination, wherein the flag is a differentiated service code point (DSCP) value of the received multicast message set to a given value; and
means for releasing at least one channel associated with the multicast session in response to a result of the means for determining.

44. The non-user device communication network entity of claim 43, wherein the means for determining interprets the DSCP value being set to the given value as indicating that the received multicast message is a final multicast message for the multicast session.

45. The non-user device communication network entity of claim 43, wherein the at least one released channel includes at least one of (i) a BCA10 channel between a radio access network (RAN) and a broadcast serving node (BSN) or (ii) a downlink broadcast channel (BCH) from the RAN to one or more access terminals (ATs).

46. The non-user device communication network entity of claim 43, wherein the received multicast message corresponds to a signaling packet.

47. The non-user device communication network entity of claim 46, wherein a first broadcast and multicast service (BCMCS) flow identifier (ID) is assigned for signaling packets associated with the multicast session and a second BCMCS flow ID is assigned for media packets associated with the multicast session.

48. The non-user device communication network entity of claim 43, wherein the means for determining only determines whether flags associated with multicast message termination are present within signaling packets.

49. The non-user device communication network entity of claim 43, further comprising:
means for resetting a reset inactivity timer after receiving the multicast message; and
wherein the means for releasing releases the at least one channel associated with the multicast session based on the reset inactivity timer exceeding a timer threshold and the means for determining determines that the received multicast message does not include the flag relating to multicast session termination.

50. A non-transitory computer-readable medium including program code stored thereon, comprising:
program code to determine a multicast message to be a final multicast message of a signaling flow for a multicast session having an indeterminate end time, the signaling flow separate from a media flow for the multicast session;
program code to insert a flag into the multicast message, the inserted flag indicating that the flagged multicast message is the final multicast message for the multicast session, wherein the program code to insert the flag sets a differentiated service code point (DSCP) value of the multicast message to a given value; and
program code to send the flagged multicast message to a non-user device communication network entity, the flagged multicast message configured to prompt the non-user device communication network entity to release at least one channel that is supporting the multicast session to a target set of multicast device participants in response to reception of the flagged multicast message.

51. The non-transitory computer-readable medium of claim 50, wherein the non-user device communication network entity is one of a broadcast serving node (BSN) or a radio access network (RAN).

52. The non-transitory computer-readable medium of claim 50, wherein the multicast message corresponds to a signaling packet.

53. The non-transitory computer-readable medium of claim 52, wherein the non-user device communication entity includes program code to assign a first broadcast and multicast service (BCMCS) flow identifier (ID) to signaling packets associated with the multicast session and program code to assign a second BCMCS flow ID to media packets associated with the multicast session.

54. A non-transitory computer-readable medium including program code stored thereon, comprising:
program code to receive, at a non-user device communication network entity, a multicast message associated with a multicast session having an indeterminate end time, wherein the multicast message is a final multicast message of a signaling flow for the multicast session, the signaling flow separate from a media flow for the multicast session;
program code to determine, at the non-user device communication network entity, that the received multicast message includes a flag indicating multicast session termination, wherein the flag is a differentiated service code point (DSCP) value of the received multicast message set to a given value; and
program code to release, at the non-user device communication network entity, at least one channel associated with the multicast session in response to the determination that the received multicast message includes the flag indicating multicast session termination.

55. The non-transitory computer-readable medium of claim 54, wherein the program code to determine interprets the DSCP value being set to the given value as indicating that the received multicast message is a final multicast message for the multicast session.

56. The non-transitory computer-readable medium of claim 54, wherein the at least one released channel includes at least one of (i) a BCA10 channel between a radio access network (RAN) and a broadcast serving node (BSN) or (ii) a downlink broadcast channel (BCH) from the RAN to one or more access terminals (ATs).

57. The non-transitory computer-readable medium of claim 54, wherein the received multicast message corresponds to a signaling packet.

58. The non-transitory computer-readable medium of claim 54, further comprising:
program code to assign a first broadcast and multicast service (BCMCS) flow identifier (ID) for signaling packets associated with the multicast session; and
program code to assign a second BCMCS flow ID for media packets associated with the multicast session.

59. The non-transitory computer-readable medium of claim 54, further comprising:
program code to reset a reset inactivity timer after reception of the multicast message associated with the multicast session having the indeterminate end time,
wherein the program code to release releases the at least one channel associated with the multicast session based on the reset inactivity timer exceeding a timer threshold and the program code to determine determines that the received multicast message does not include the flag relating to multicast session termination.

* * * * *